Patented June 7, 1938

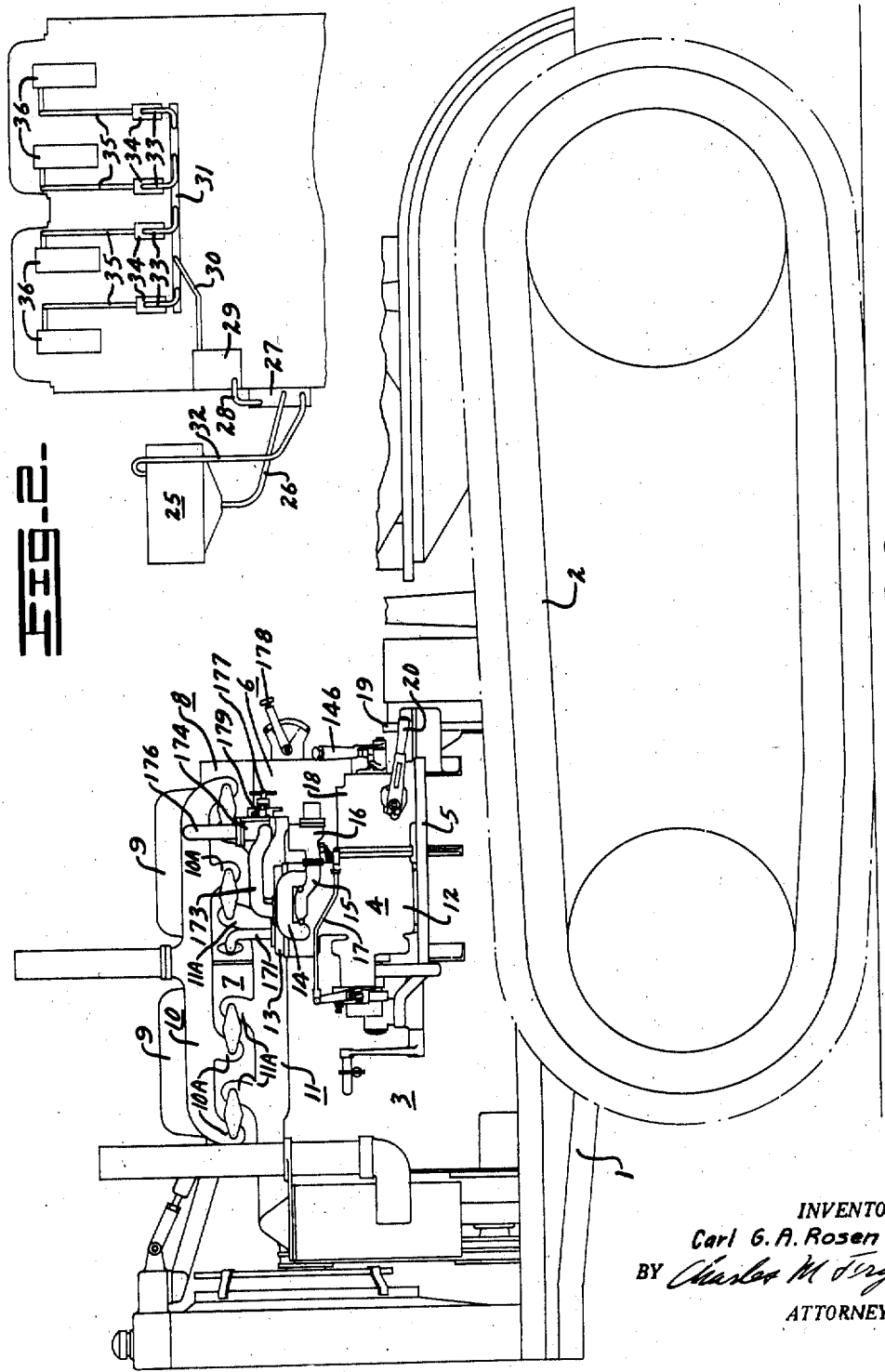

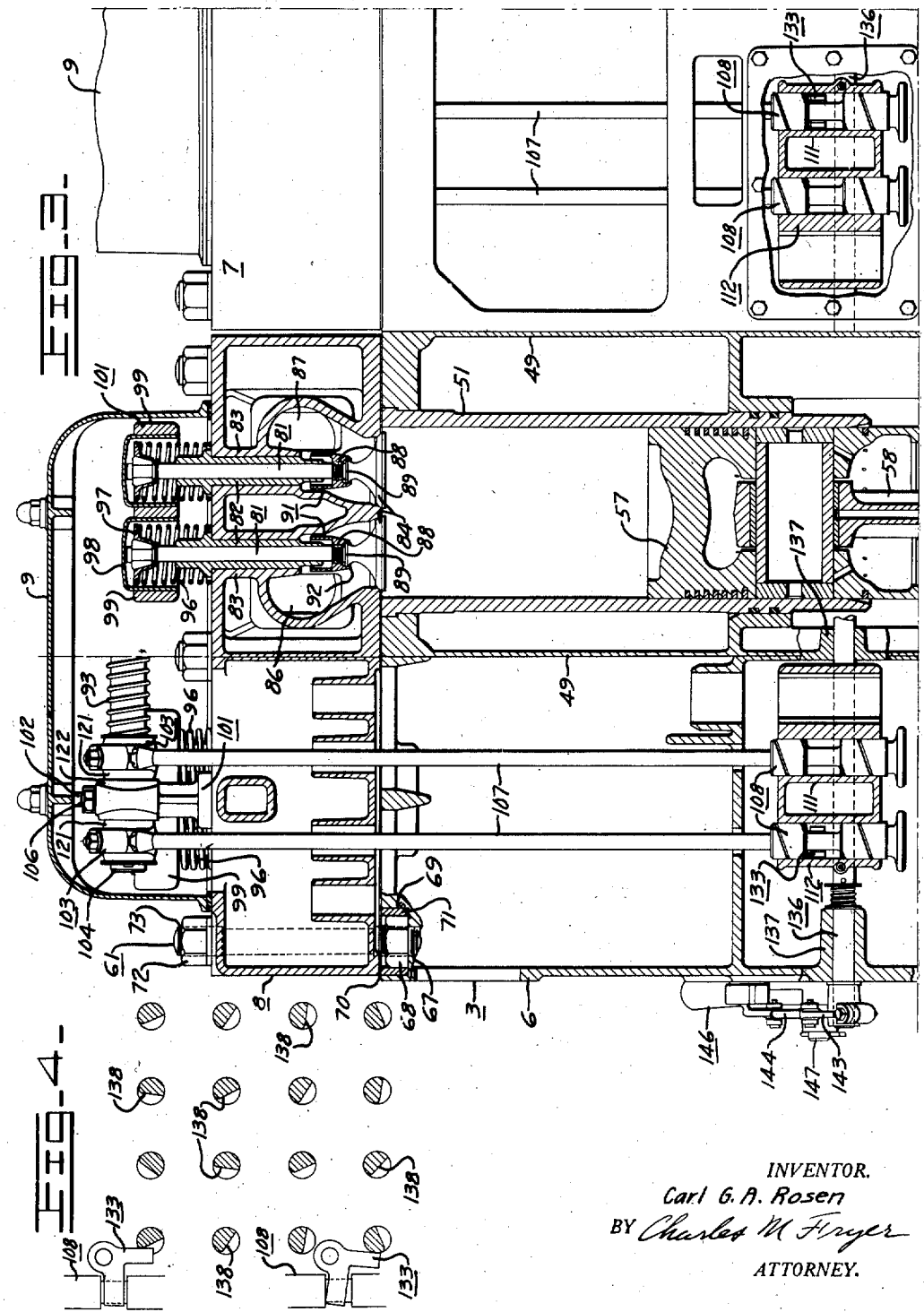

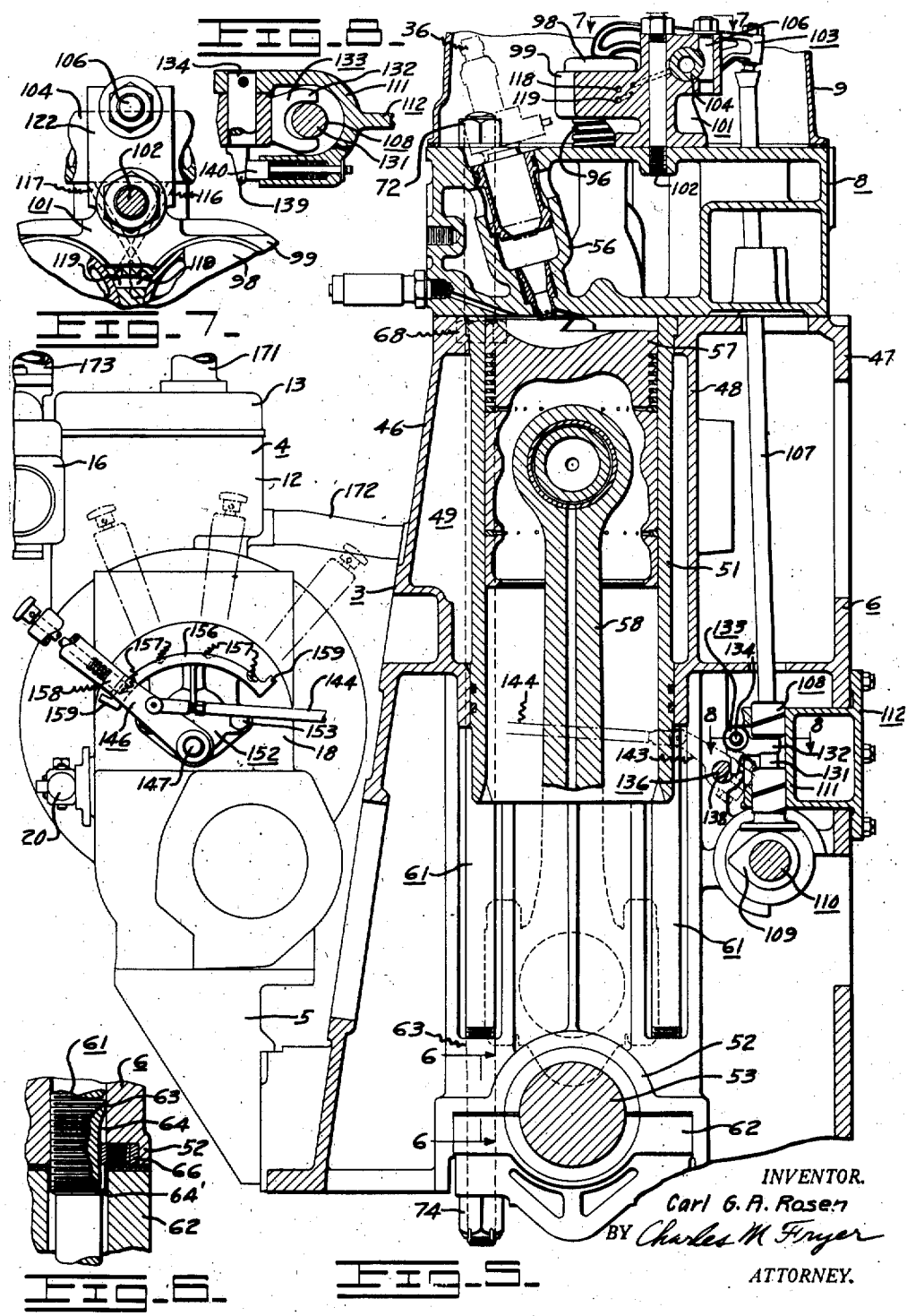

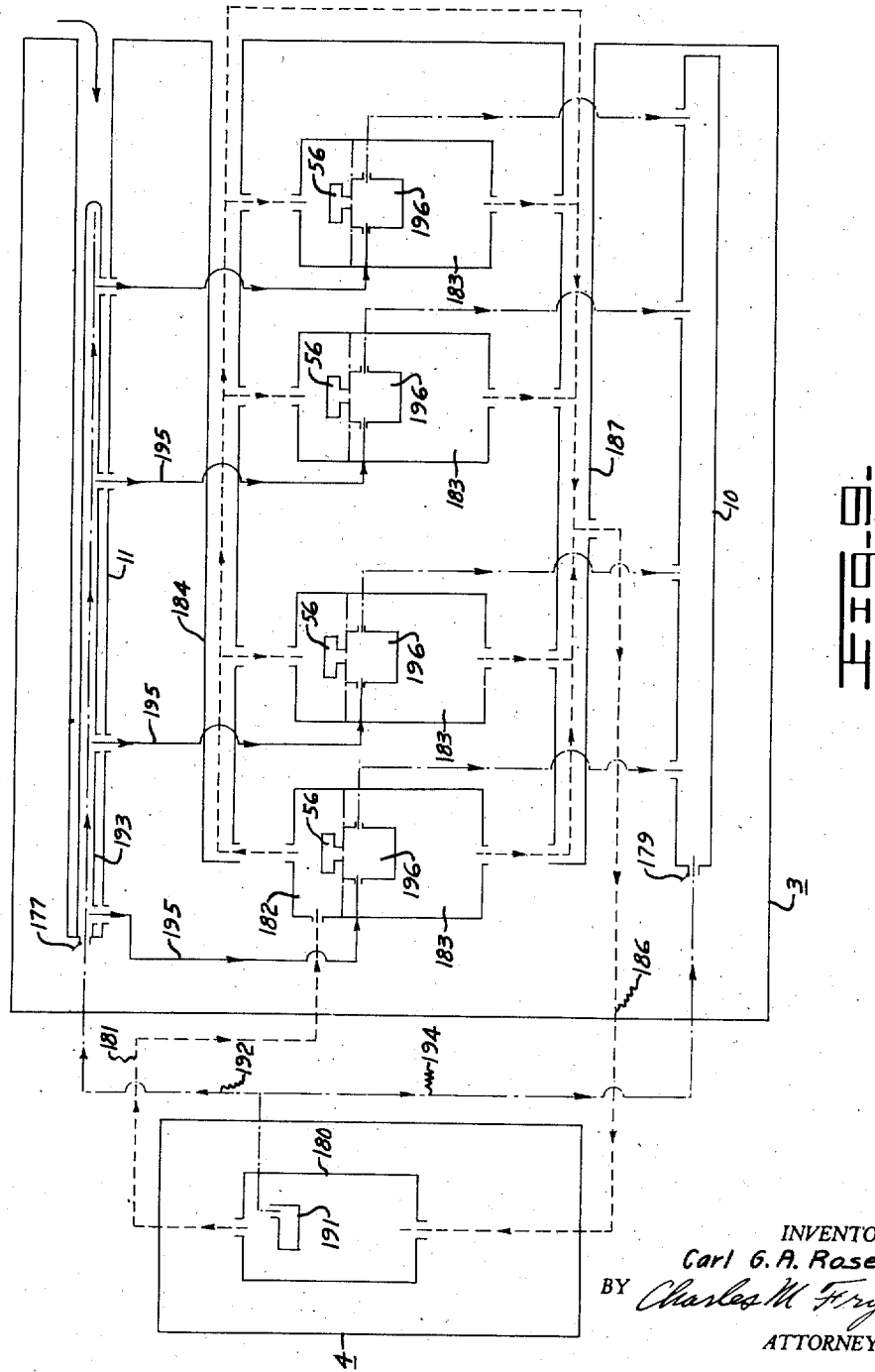

2,119,794

UNITED STATES PATENT OFFICE 2,119,794

ENGINE STARTING MEANS

Carl G. A. Rosen, Oakland, Calif., assignor to Caterpillar Tractor Co., San Leandro, Calif., a corporation of California Application October 10, 1933, Serial No. 692,964

7 Claims. (Cl. 123—179)

The present invention relates to internal combustion engines, and has for its object the provision of a compression ignition and the like engine adapted for use as the power plant of a track-type tractor. This application is a continuation-in-part of my co-pending application Serial No. 684,179, filed August 8, 1933.

Compression ignition engines have been used for some time in stationary power plants, and in power plants for marine use, and for some land vehicles. However, known types of compression ignition and the like engines are not suitable for use in tractors, and particularly in tractors of the track-laying type, for reasons which are pointed out hereinafter.

The problem of providing a track-type tractor having a compression ignition and the like engine presents many difficulties, and a consideration of the widely varying conditions under which such tractors operate will aid in an understanding of the qualities which a high compression or compression ignition engine must possess in order to power a track-type tractor. The assignee of this application has had long experience in building track-type tractors, the first of which were powered by steam engines. Later, gasoline or carburetor engines were used as the power for such tractors. When an attempt was made to use known gasoline engines for tractor service, it was found that such engines, even though suitable for stationary, marine, and automotive service, could not meet the severe requirements of track-type tractor service. As a result, a gasoline engine suitable for tractor service was developed, and the years of experience with thousands of such gasoline-powered tractors, have provided an intimate knowledge of the qualities and requirements which must be found in any track-type tractor power plant. Many of the requirements which are necessary in a compression ignition engine for use in track-type tractors are desirable for use in wheel tractors and relatively small power plants, but, as the particular type of construction and mode of operation of track-type tractors adapt them for use in many ways for which a wheel tractor is unsuitable, there are many additional requirements for the use of compression ignition engines in such tractors.

Tractors of the track-type comprise generally a main frame which is supported on a pair of endless track mechanisms, so that the tractor is capable of operation over rough, uneven ground, and over soft, marshy land, where it is impossible for a wheel vehicle to travel. Also, track-type tractors can be turned practically within their own length and have a low center of gravity, and, hence, are adapted for operation on steep hillsides, as in logging, trail building, and the like.

Track-type tractors must operate under widely varying conditions. For example, one tractor may be placed in the swamp of an African jungle and driven by native labor, while another may be used to propel a snow-plow to clear roads in freezing weather. Still another tractor may be called upon to operate in a constant cloud of dust over a field of pulverized soil in agricultural work, while a fourth may be used for dragging logs up steep grades in the mountains. It is obvious, therefore, that a tractor, to meet these requirements, must have an extremely flexible design which will accommodate itself to widely varying climatic conditions and to operation in the hands of unskilled labor.

The various features which a successful compression ignition engine for track-type tractors should have are discussed fully in my above-noted application, as well as the various operating requirements which are imposed on a tractor engine by tractor service. It has been found that four-cycle compression ignition engines including precombustion chambers into which fuel is injected by a solid injection type fuel system including an individual fuel injection pump for each cylinder provides the most simple, reliable, and uniform action engines for oil burning tractor power plants.

Another very important problem in providing a compression ignition engine for track-type tractors is the starting system that is employed. Such a system must have a simple, reliable and positive means of starting which is easily operated and is capable of functioning continuously for whatever period is necessary, supplying a uniform torque to operate the compression ignition engine under compression at a speed sufficiently high to obtain, even in the coldest weather, the necessary temperature in the cylinders of the compression ignition engine for ignition of the fuel. The starting means must be as small and compact as possible, while having a strong and rugged design. Further, the starting means should include a source of heat so that the compression ignition engine can be warmed, particularly in cold weather, to a temperature approximating operating temperatures thereof.

Electric starting, while perhaps satisfactory for wheel vehicles running on fairly smooth surfaces, is entirely unsatisfactory for use in track-type tractors as the rough usage to which such tractors are subjected, subjects the storage battery to jolts and jars which it cannot withstand. Furthermore, the period of operation of the starter is definitely limited by the electric storage capacity. It is to be noted also that to provide a supply of heat from an electrical starter would involve a complicated wiring and insulating problem in the engine, as well as requiring larger storage batteries. It is believed evident, therefore, that an electric starter is not suitable for a tractor power plant of the compression ignition engine class, particularly where the tractor is operated in cold climates.

Air starting, which is sometimes used for stationary and marine installations, involves the difficulty of providing storage capacity for air and providing means for compressing the air for use in starting. This equipment is too bulky and cumbersome for use on tractors, and is also unsatisfactory in that it is impractical to filter efficiently the quantity of air required for such operation. Moreover, the storage capacity for air, limits the period of operation for this starter. Another obvious disadvantage of air starting is that it is necessary to provide an auxiliary source of heat to aid in heating the engine, particularly in cold weather, to approximate operating temperatures.

Another starting system sometimes employed for compression ignition engines consists in constructing the engine to provide for operation thereof as a spark ignition engine for starting. Such constructions usually include auxiliary combustion chambers which are shut off from the main combustion chambers for compression ignition operation, but are placed in communication therewith for starting to increase the combustion chamber volume for use with gasoline as a fuel. It is believed obvious that such a construction is complicated and involves many difficulties. The principal difficulty encountered is the provision of effective, fool-proof means for sealing off the auxiliary spark ignition combustion chambers from the compression ignition combustion chambers so that there is no possibility of gasoline leaking into the combustion chambers during operation of the compression ignition engine as such. It is apparent that combustion of such leakage gasoline in the relatively small combustion chamber volume would cause dangerously high explosive pressures, and such high pressures have been known to blow off the cylinder heads. Furthermore, the control for converting the engine from a compression ignition engine to a spark ignition engine, and vice versa, must be simple, positive, and reliable so that it can be operated by unskilled labor. Due to the difficulty of providing a satisfactory structure of the type described, and due to the inherent danger of seal failure resulting in gasoline leakage, operation of the compression ignition engine as a spark ignition gasoline burning engine for starting has not proven satisfactory for tractor service.

The starting system disclosed herein employs a low compression spark ignition engine which is mounted on the side of the compression ignition engine and provides a simple, dependable starter which has ample power and is capable of furnishing power at any time and over extended cranking periods. Due to this fact, the tractor can also be moved when under repair or when it breaks down, by using the starting engine. Further, a ready source of heat is available to aid in starting the compression ignition engine. Such a source of heat is particularly important in the precombustion chamber type of engine where ignition must first occur with air which is cooled in being forced through restricted orifices from the main combustion chamber to the precombustion chamber. Heating the cylinders of the compression ignition engine in cold weather also serves to break down the resistance to cranking which is caused by the lubricant film between the pistons and cylinder walls. This is important as the starting engine must be able to turn over the compression ignition engine at a sufficiently high rate of speed to overcome the pressure drop between the combustion chambers and the precombustion chambers caused by the restricted orifices therebetween, so that the air is compressed to a sufficient degree to cause ignition of injected fuel.

The starting system of this invention for the compression ignition engine is compact, simple and easily operated, being in the form of a low compression spark ignition engine which operates on fuel of high volatility, such as gasoline, which can be easily obtained in any part of the world. Thus, the starter provides ample power which is capable of operating at any time for indefinite cranking periods to start the compression ignition engine. In addition, the starting engine provides a source of hot gases and hot water to aid in starting the compression ignition engine. The starting system, therefore, has all the essential requirements to fit it for use with a compression ignition engine for a tractor.

It is an object of the invention, therefore, to provide a starting system for a compression ignition and the like engine adapted for use as the power plant of a tractor.

Another object of the invention is to provide a method of starting a compression ignition and the like engine.

Another object of the invention is to provide a unitary control for selectively relieving compression in the cylinders of a compression ignition and the like engine during starting thereof.

Another object of the invention is to position the starting controls for a compression ignition and the like engine in juxtaposed relation to facilitate manipulation thereof in starting the engine.

Another object of the invention is to provide interchangeable cylinder heads for a compression ignition and the like engine, wherein each of the heads is associated with a plurality of cylinders.

Another object of the invention is to provide an improved tie rod construction for compression ignition and the like engines.

Another object of the invention is to provide pressure lubrication for the valve operating mechanism of an internal combustion engine.

Certain features of the compression ignition engine, and the starting system therefor will now be disclosed.

Description of figures

Fig. 1 is a left side elevation of a track-type tractor having a power plant constructed and operating according to the instant invention.

Fig. 2 is a schematic view illustrating the fuel injection system.

Fig. 3 is a partial vertical longitudinal section of the engine, No. 4 cylinder being taken on the axis of the push rods and No. 3 cylinder on the axis of the cylinder.

Fig. 4 is a schematic view illustrating the operation of the compression relief mechanism.

Fig. 5 is a transverse vertical section through the engine on the axis of a cylinder.

Fig. 6 is a fragmentary section illustrating a part of the tie rod construction taken on the line 6—6, Fig. 5.

Fig. 7 is a fragmentary plan view of a portion of the valve operating mechanism taken on the line 7—7, Fig. 5, certain portions being broken away to disclose the construction more clearly.

Fig. 8 is a fragmentary horizontal section taken on the line 8—8, Fig. 5, and illustrates a portion of the compression relief mechanism.

Fig. 9 is a schematic view illustrating the method of starting the primary compression ignition engine.

Description of power plant

The track-type tractor disclosed herein comprises main frame 1 (Fig. 1) which is supported on a pair of opposite, similar endless track mechanisms 2, only one of which is seen in Fig. 1. Frame 1 supports the tractor power plant comprising primary compression ignition and the like engine 3 and auxiliary starting engine 4, supported on engine 3 by bracket 5. Primary engine 3 comprises block 6 having cylinder heads 7, 8 secured thereon provided with respective covers 9. Exhaust manifold 10 and intake manifold 11 are secured to heads 7, 8.

Starting engine 4 (Fig. 1) includes block 12 having head 13, exhaust manifold 14, and intake manifold 15 thereon. Carburetor 16 secured to manifold 15 has throttle control rod 17 connected thereto whereby the speed of the starting engine can be controlled. Transmission case 18 secured to block 12 houses a drive connection from the starting engine to flywheel 19 of the primary engine, the drive being controlled by clutch control lever 20. The operation of the starting engine and the various connections between said engine and the primary engine are described more specifically hereinafter.

The fuel injection system, illustrated schematically in Fig. 2, includes fuel supply tank 25 from which fuel is drawn under a positive head through conduit 26 by fuel transfer pump 27. Pump 27 forces fuel under a constant head through conduit 28, fuel filter 29, and conduit 30 to fuel manifold 31. A large quantity of excess fuel is by-passed from pump 27 through conduit 32 to tank 25, such by-passing serving to remove air entrained in the fuel. From fuel manifold 31, respective conduits 33 lead to fuel injection pumps 34, each of which is connected by a conduit 35 with an associated fuel injection nozzle 36. Pumps 34 are operated to force measured amounts of fuel through conduits 35 and nozzles 36 in accordance with the firing order of the cylinders. Each nozzle 36 ejects fuel in the form of an atomized spray into the associated precombustion chamber where ignition occurs. For a complete description of the fuel injection system and the combustion process, reference is hereby made to the above-identified application.

Primary engine construction

Block 6 of the primary engine comprises an integral casting in which a plurality of compartments are provided for the cylinder and the various mechanisms associated therewith, in operation of the engine. Block 6 includes left side wall 46 (Fig. 5), right side wall 47 and intermediate wall 48. Walls 46 and 48 are joined by a plurality of transverse walls 49 (Figs. 3 and 5), providing cylinder compartments in which a plurality of cylinder liners 51 are suitably mounted. Adjacent the bottom, each transverse wall 49 (Fig. 5) is provided with bearing portion 52 for mounting crankshaft 53.

Cylinder heads 7, 8 are similar, and only one will be described in detail. Cylinder head 8 (Fig. 5) includes at each cylinder, a precombustion chamber 56 into which the nozzle 36 injects fuel and which communicates with a main combustion chamber provided between the bottom wall of the cylinder head and piston 57, which is mounted in liner 51 and connected to crankshaft 53 by connecting rod 58. The cylinder head also includes suitable intake and exhaust passages, and provides mounting means for valve mechanism.

Means are provided for securing the cylinder heads, engine block, and main crankshaft bearings together as a unit, said means including substantially uni-diameter tie rods. The tie rods are secured with respect to the block whereby they are pre-stretched uniformly to avoid strains in the block structure, and localized strains in the tie rods are prevented because of their uni-diameter construction throughout the stretched portions thereof. As both the main bearing caps and the cylinder head are secured to the block, the explosive pressure on the cylinder head is carried directly to the point of reaction at the main bearings. As a plurality of similar tie rods, six for each cylinder head, are provided, only one will be described in detail.

Each tie rod 61 (Fig. 5) extends through apertured bosses in block 6 and head 8 and through an aligned aperture in bearing cap 62. Said tie rod 61 (Figs. 5 and 6) has threaded engagement with block 6 at 63 and is provided with longitudinal slot 64 having an open lower end 64' adapted to allow insertion therein of key 66 (Fig. 6) which is seated in a suitable recess in bearing portion 52, being held therein by bearing cap 62. Key 66 is threaded internally to receive an instrument to facilitate ready installation and removal thereof. Adjacent the top of block 6 (Fig. 3), tie rod 61 has threaded portion 67 which receives nut 68 within recess 69 in said block 6. After tightening of nut 68, spacer 71 is placed around said nut in recess 69 to provide a support for gasket 70. Thus, it is seen that the tie rod is secured to the block and can be pre-stretched with respect thereto by tightening of nut 68. Cylinder head 8 is secured on block 6 by nut 72 engaging threaded portion 73 of tie rod 61. For all practical purposes, tie rod 61 is of substantially uniform diameter throughout, except for slight reductions in diameter adjacent the ends of the rod to facilitate manufacture of threads 63 and 67 thereon. Bearing cap 62 (Fig. 5) is secured in place by nut 74 threaded and keyed on the lower end of tie rod 61.

From the foregoing description, it is seen that common means are provided for securing the block, cylinder heads and crankshaft together as a unit, means being provided for pre-stretching the securing means to avoid strains in the block structure. Furthermore, the tie rods enable the cylinder heads to withstand the extremely high pressures which obtain in a compression ignition engine.

As stated above, intake and exhaust valves are mounted in the heads for each cylinder of the engine, and means are provided for preventing the transmission of any side thrust to the valves during operation thereof. Similar intake and exhaust valves 81 (Fig. 3) are mounted in bushings 82, seated in bosses 83, of head 8. Valves 81 have seats 84 engaging complementary seats in the bottom wall of head 8 and controlling the flow of air and gases through respective intake and exhaust passages 86 and 87.

Means are provided for shrouding the lower joints between the valve stems and the bushings, to protect against corrosion, and the building up of a carbon formation on the guides or stems which would otherwise cause sticking of the valves. Each valve 81 (Fig. 3) is provided adjacent its lower end, with raised threaded portion 88 above annular rim 89. Cup-shaped shroud member 91 is threaded on portion 88 and has lip 92 engaging over rim 89. The upper portion of member 91 overlaps the lower end of bushing 82 to protect the joint. Thus, it is seen that the shroud members protect the valves and bushings from the flow of exhaust gases. Shroud members are mounted on the intake valves, also, to provide complete interchangeability of heads 7, 8. As seen in Fig. 1, intake manifold passages 11A communicate with the rearward passages in head 7 and with the forward passages in head 8, the reverse being true with exhaust manifold passages 10A. Hence, if heads 7, 8, are interchanged, the exhaust valves of each head in the position shown become intake valves in the new position, and vice versa. The interchangeability of the heads lends itself to economy of manufacture, and facilitates assembly and repair as no special care is required in assembling the heads on the block.

Each valve 81 is urged to closed position by spring 96 compressed between head 8 and retainer 97, keyed on the upper end of valve 81. The upper end of each valve is engaged by the central portion of a cup-shaped member 98, slidably mounted in a boss 99 (Figs. 3 and 5) of rocker arm bracket 101, a pair of bosses 99 being provided in each bracket 101. Each bracket 101 is mounted on head 8 by means of stud 102 and provides a mounting for the rocker arms as well as for guides 98.

Rocker arms 103 (Figs. 3 and 5) for each cylinder are mounted on hollow shaft 104 clamped in similar spaced brackets 101 by means of studs 106, bracket 101 for the rear cylinder only being shown. Each rocker arm 103 (Fig. 5) is operated through push rod 107 and valve lifter 108 from cam 109 on cam-shaft 110. Valve lifter 108 reciprocates in and is guided by vertically apertured boss 111 in cover 112 which is secured to block 6. As the rocker arm oscillates, the nose thereof, in engagement with cup-shaped guide 98, has relative lateral movement with respect thereto, and the side thrust resulting therefrom is absorbed by boss 99 whereby only axial thrust is applied to the valve.

Means are provided for supplying lubricant to the bearing surfaces of the valve guides and the mounting means therefor, the lubricating means including reservoirs providing a supply of lubricant when the engine is started and before lubricant is supplied thereto by the lubricant pump. Lubricant is forced under pressure to hollow shaft 104 (Figs. 5 and 7) from which it is transmitted through suitable apertures to the bearing surfaces of rocker arms 103 thereon. Bracket 101 (Fig. 7) is provided adjacent each rocker arm 103 with lubricant passages 116, 117 which extend downwardly and open into lubricant reservoirs 118, 119 extending between the bearing surfaces of respective bosses 99 in bracket 101. As seen in Fig. 3, bosses 121 of rocker arms 103 for each cylinder are maintained in close engagement with boss 122 of associated bracket 101 by spring 93 around shaft 104 and compressed between the rocker arms of adjacent cylinders. As passages 116, 117 (Fig. 7) open at the edges of boss 122 mounting shaft 104, lubricant is supplied thereto from overflow lubricant pumped to the rocker arms adjacent thereto and flows down said passages 116, 117 to reservoirs 118, 119 from whence it is supplied to the bearing surfaces of guides 98 in bosses 99.

From the foregoing description, it is seen that an efficient valve operating mechanism is provided for controlling the operation of the intake and exhaust valves of the engine, such mechanism including means for preventing the transmission of side thrust to the valves and lubricating means therefor.

Compression relief mechanism is provided for relieving compression of one or more of the cylinders during the starting operation, said mechanism including a settable manual control which places the cylinders under compression in a predetermined sequence as controlled by the operator. More specifically, the compression relief mechanism comprises common means for moving the exhaust valves of the cylinders to open position whereby communication is established between the cylinders and the atmosphere.

As shown in Figs. 5 and 8, each valve lifter 108 for an exhaust valve is provided with central reduced portion 131 which is embraced by forked end 132, of bell-crank 133 extending within boss 111. Bell-crank 133 is mounted on stud 134, carried in suitable ears on cover 112. The vertical arm of bell-crank 133 is resiliently urged against a cam surface provided on an operating shaft whereby the bell-crank is oscillated to lift the push rod and open the exhaust valve. Shaft 136 (Figs. 3 and 5) is journaled in a plurality of similar bosses 137 in block 6, and said shaft is provided adjacent each bell-crank 133 with flat 138 providing a cam surface for rocking the bell-crank. As described later, flats 138 are circumferentially spaced on shaft 136 to provide for sequential operation of bell-cranks 133 to control opening of the exhaust valves. To maintain the bell-cranks in operative relation with the associated cam surfaces, each bell-crank 133 (Fig. 8) has laterally projecting ear 139 on the vertical arm thereof engaged by spring-pressed plunger 140 slidably mounted in boss 111 of cover 112.

Manual control means for the compression relief mechanisms is provided, mounted on the auxiliary engine in juxtaposed relation with other control means which is manipulated in starting operations. Shaft 136 (Figs. 3 and 5) extends without block 6, and has arm 143 keyed and clamped thereon. Arm 143 is connected by link 144 to control lever 146, pivoted at 147 on transmission case 18 of starting engine 4. Starting engine 4 (Fig. 5) is mounted by bracket 5 on block 6 and is adapted to drive the primary engine through a controllable drive connection during starting operations in a manner fully disclosed in my above-noted application. The drive connection between the engines is controlled by clutch control lever 28 mounted in juxtaposed relation with control lever 146.

A plurality of latching stations are provided for compression relief control lever 146 whereby the compression relief mechanism is maintained resiliently in any one of a plurality of adjusted positions. Bracket 152 (Fig. 5) in which pivot shaft 147 for control lever 146 is mounted is secured by screws 153 to transmission case 18. Said bracket 152 has integral arcuate sector 156 concentric with pivot 147 and having recesses 157 adapted to receive spring-pressed pin 158 slidably mounted in lever 146. Ears 159, at the ends of sector 156, limit travel of control lever 146 with respect thereto. Thus, as control lever 146 is oscillated to a selected position, link 144 serves to oscillate shaft 136, whereby the various bell-cranks 133 are oscillated to relieve or place compression on the various cylinders of the engine.

As described more fully hereinafter, during initial rotation of the primary engine crankshaft, compression is relieved in all cylinders of the engine, control lever 146 being located in its right-most position, as viewed in Fig. 5. This condition is illustrated diagrammatically in the bottom row in Fig. 4 where the shaded portion of the shaft sections illustrates the solid portion of the shaft, and the unshaded portion the cut-away part of the shaft forming cam surfaces 138. It will be noted in Fig. 4 that in the bottom row all cam surfaces 138 are so positioned that bell-cranks 133 are located in their active position, only one bell-crank 133 being illustrated.

The top row in Fig. 4 illustrates diagrammatically the condition of the four cam surfaces on the control shaft when all four cylinders are under compression, bell-cranks 133 remaining in their inactive position. This condition obtains during operation of the primary engine as a fuel burning engine.

During starting of the compression ignition engine, lever 146 is moved successively from the right to the left, as viewed in Fig. 5, the second position from the right places one cylinder under compression, and the third position from the right places two cylinders under compression. These conditions are illustrated schematically in Fig. 4 where in the third row from the top it will be noted that the No. 2 cylinder cam surface 138 is so positioned as to permit the associated bell-crank 133 to remain in its inactive position, whereby the associated exhaust valve functions normally, and the associated cylinder is under compression. In the second row from the top, Nos. 2 and 3 cylinders have their cam surfaces 138 positioned to permit normal operation of the exhaust valve, whereby compression is provided in said cylinders.

From the foregoing description, it is seen that from the initial condition of the engine in starting, i. e., compression relieved in all of the cylinders, operation of the compression relieved control lever places the cylinders under compression in a selected sequence. This is desirable as it does not place too great a load on the starting engine during starting operations, as certain of the cylinders fire and assist the starting engine in placing the remaining cylinders under compression to reach operating temperatures, and insure ignition in all the cylinders of the engine.

Furthermore, a unitary compression relief control means is provided which is manually adjustable to relieve compression in one or more of the cylinders of the compression ignition engine to aid in starting. It is to be noted that the control shaft having circumferentially spaced cam surfaces thereon is readily installed in the engine block, and that the bell-cranks operated thereby are mounted in detachable covers whereby an operative connection is established therebetween when said covers are secured to said block.

Starting method

The starting system includes an auxiliary spark ignition engine which drives the primary compression ignition engine until such engine operates as a fuel burning engine, when the starting engine is stopped. A clutch controlled Bendix drive is provided between the starting engine and the compression ignition engine, the starting engine being operated for a period before a driving connection is established therefrom to the compression ignition engine. During this period, the heat developed by the starting engine in the cooling medium and in exhaust gases is transferred to the compression ignition engine, various connections being provided for this purpose.

For providing for transfer of the cooling medium, conduit 171 (Fig. 1) leads from head 13 of auxiliary engine 4 to head 8 of primary engine 3, and conduit 172 (Fig. 5) leads from block 6 of primary engine 3 to block 12 of auxiliary engine 4. Head 7 is also adapted to receive cooling medium from conduit 171 when the positions of the heads are exchanged. In the position shown, the aperture in head 7 is closed by a suitable plug (not shown). For providing for the transfer of hot exhaust gases, conduit 173 (Fig. 1) leads from auxiliary engine exhaust manifold 14 to exchange unit 174, which is connected to primary engine exhaust manifold by conduit 176, and communicates with a perforated conduit (not shown) in primary engine intake manifold 11, valve 177 opening and closing said perforated conduit. It is to be noted that valve 177, throttle control 17, clutch control lever 20, compression relief control lever 146 and fuel pump control lever 178 are arranged in juxtaposed relation to facilitate manipulation thereof by the operator in starting operations.

The starting method, which will now be described in detail, is illustrated schematically in Fig. 9. In said figure the flow of the cooling medium is indicated in dotted lines, the flow of exhaust gases in dot dash lines, and the intake flow of air in solid lines.

To condition the power plant for starting in cold weather, the controls are set in the following manner: clutch control lever 20 in clutch disengaging position; compression relief control lever 146 to relieve compression in all the cylinders; heat exchange valve 177 in open position; valve 179 in closed position; fuel pump control lever 178 positioned to shut off all the fuel pumps. The starting engine is then cranked and the starting engine is operated at full speed.

During this period of operation the cooling medium, usually water, flows from water space 180 of auxiliary starting engine 4 through path 181, circulates throughout primary engine 3, as indicated in dotted lines in Fig. 9, being introduced into water space 182 of the cylinder head of the primary engine in close proximity to one of the precombustion chambers 56. The walls of this precombustion chamber are thereby heated during the preliminary operating period of the starting engine, and this preliminary heating reduces the chill of the water jacket surrounding both the precombustion chamber and part of the main combustion chamber. From said water space 182, the medium flows to cylinder water space 183 and to inlet water manifold 184. The other cylinders are also heated by the flow of the heated cooling medium as indicated in Fig. 9. The cooling medium returns by path 186 from outlet water manifold 187 to water space 180 of auxiliary engine 4. The above-described circulation of the cooling medium continues until operation of auxiliary engine 4 is stopped.

During this period also, as valve 177 is open and valve 179 closed, the exhaust gases from auxiliary spark ignition engine 4 are conveyed from combustion chamber 191 of engine 4 by path 192 to pipe 193 in intake manifold 11 of primary engine 3, valve 177 being open, and valve 179 controlling path 194 to exhaust manifold 10 being closed. During the preliminary operation, as valve 179 which controls the flow of exhaust gases to primary engine exhaust manifold 10 is set in closed position, all such gases pass into intake manifold 11 so that such gases together with heated air are drawn into cylinders 196 of the primary compression ignition engine. The flow of exhaust gases from starting engine 4 to intake manifold 11 is indicated by the dot dash line 192 in Fig. 9. The solid lines 195 indicate the flow of the mingled exhaust gases and heated air from manifold 11 to the combustion chambers 196 of the primary engine.

The interior of the compression ignition cylinders are heated, therefore, by the introduction of hot air and hot gases, which bring the wall temperatures to approximate compression ignition engine running conditions. Some hot starting engine exhaust gas is also stored in the unscavenged portion of each precombustion chamber. After the compression ignition engine has been heated for a sufficient period, the flow of exhaust gases thereto is stopped by opening valve 179 and closing valve 177 and a driving connection is established between the engines.

To establish the driving connection, the speed of starting engine 4 (Fig. 1) is reduced by manipulation of throttle control 17, and clutch control lever 20 is moved slightly to cause operation of the Bendix drive unit to mesh the shiftable gear thereof with the gear on flywheel 19. Thereafter lever 20 is moved entirely into clutch engaging position and throttle control 17 is moved to full speed position.

During initial rotation of the compression ignition engine crankshaft, compression is relieved in each cylinder to permit sufficient momentum being gained to rotate the compression ignition engine under compression. After sufficient momentum has been gained, compression relief lever 146 is set to place compression on the cylinders seriatim whereby the intake air is heated sufficiently to cause ignition. If the starting engine loses speed, lever 146 is set back to determine compression on one or two cylinders until such cylinders are heated by the compression developed. While the starting engine drives the main or compression ignition engine, it is under load; consequently it will heat up more readily. As a result, heating of the main engine will be enhanced by the heated cooling medium. Also, during the operation of the main engine by the starting engine, the main engine pump will effect positive circulation of the heated cooling medium thereby further enhancing transference of heat uniformly throughout the main engine. The cylinder first placed under compression is that cylinder which first receives the heated cooling medium from the starting engine adjacent its precombustion chamber, and hence such cylinder will first reach operating temperatures.

During all of the above operations, the fuel injection pumps of the compression ignition engine are set in no pumping position. However, when the temperature of any cylinder or cylinders of the engine approximates running conditions, i. e., after a few compression strokes, the fuel injection pumps are adjusted to start pumping by means of lever 178 and injection of fuel ensues. Upon injection of fuel into the precombustion chambers, whose walls have been heated and which contain hot air and hot exhaust gases, ignition is positive, and starting of the compression ignition engine is accomplished. As soon as the compression ignition engine operates as a fuel burning engine, the starting engine is stopped.

In extremely cold weather, when the power of the starting engine is sufficient to turn over the main engine with compression in only fewer than the full number of cylinders of the main engine, the one or two cylinders which are under compression are maintained in such condition until such cylinders fire. Then the remaining cylinders are placed under compression until all cylinders are firing.

When the primary engine is warm, either from previous operation or due to climatic conditions, no exhaust gases need be transferred to the cylinders of the primary engine, compression relief lever 146 is positioned at once to place compression on all cylinders, and control lever 178 is set immediately thereafter to enable the fuel injection pumps.

From the foregoing description, it is seen that an effective and flexible method of starting is provided for the compression ignition engine which insures starting of said engine under all climatic conditions, and which can be readily employed, even by unskilled operators. It is to be noted that the grouping of all the controls within reach of the operator facilitates performance of the method.

I, therefore, claim as my invention:

1. A starting method for a primary compression ignition and the like engine having an auxiliary starting engine, comprising relieving compression in the cylinders of the primary engine, operating the auxiliary engine to effect circulation through the primary engine of, cooling medium heated by the auxiliary engine and to introduce air heated by the auxiliary engine into the cylinders of the primary engine, establishing a drive connection from the auxiliary engine to the primary engine with the fuel injection system thereof disabled, placing compression on fewer than the full number of cylinders of the primary engine, and after a cylinder of the primary engine has been heated sufficiently enabling the fuel injection system of the primary engine.

2. A starting method for a primary compression ignition and the like engine having an auxiliary starting engine and a fuel injection system, comprising providing an interconnection for compression relief of said primary engine cylinders in a fixed sequence, relieving compression in all of the cylinders of the primary engine, transferring a heated medium from said auxiliary engine to said primary engine to bring said primary engine up to a temperature sufficient for starting operation thereof, establishing a drive connection from the auxiliary engine to the primary engine with the fuel injection system of the primary engine disabled, manipulating said interconnection to place in a predetermined relationship compression on said primary engine cylinders, and controlling enabling of said fuel injection system in accordance with said manipulations.

3. The combination with a compression ignition and the like engine, of an auxiliary spark ignition starting engine therefor, a controllable drive connection from said auxiliary engine to said primary engine, a fuel injection system for said primary engine, means for conducting a heated cooling medium from said auxiliary engine to heat said primary engine, a compression relief mechanism for each of the primary engine cylinders, means interconnecting said compression relief mechanisms for operation in a predetermined sequence, and means for controlling supply of fuel by said fuel injection system.

4. A starting method for a primary compression ignition and the like engine having an auxiliary starting engine, comprising relieving compression in cylinders of the primary engine, enabling circulation between said primary engine and said auxiliary engine of a cooling medium heated by the auxiliary engine, operating the auxiliary engine to drive the primary engine with the fuel injection system of the primary engine disabled, placing compression on cylinders of the primary engine in a predetermined relationship to condition them for firing thereof, and when the primary engine cylinders are in condition to fire supplying fuel to the primary engine.

5. The combination with a primary compression ignition and the like engine, of an auxiliary spark ignition starting engine therefor, a controllable drive connection from said auxiliary engine to said primary engine, a control for said drive connection positioned adjacent said auxiliary engine, a fuel injection system for said primary engine, means for conducting a heated cooling medium for said auxiliary engine to heat said primary engine, a compression relief mechanism for each of the primary engine cylinders, common means for operating said compression relief mechanism including a control member positioned adjacent said auxiliary engine whereby an operator can readily manipulate said control member and said drive connection control during the starting operation, and means for controlling supply of fuel by said fuel injection system.

6. A starting system for a primary compression ignition and the like engine having a plurality of cylinders, comprising an auxiliary spark ignition starting engine positioned adjacent said primary engine, a controllable drive connection from said auxiliary engine to said primary engine, a control member for said drive connection, a compression relief mechanism for each of the primary engine cylinders, and common means for operating said compression relief mechanism including a single control member, both of said control members being positioned adjacent said auxiliary engine whereby they may be readily manipulated by an operator during the starting operation.

7. A starting system for a primary compression ignition and the like engine having a plurality of cylinders, comprising an auxiliary spark ignition starting engine, said auxiliary engine being secured to said primary engine to provide a compact structure, a controllable drive connection from said auxiliary engine to said primary engine, a control member for said drive connection, a compression relief mechanism for each of the primary engine cylinders, and common means for operating said compression relief mechanism including a single control member, both of said control members being positioned adjacent said auxiliary engine whereby they may be readily manipulated by an operator during the starting operation.

CARL G. A. ROSEN.

CERTIFICATE OF CORRECTION.

Patent No. 2,119,794. June 7, 1938.

CARL G. A. ROSEN.

It is hereby certified that error appears in the printed specification of the above numbered patent requiring correction as follows: Page 6, second column, line 44, claim 1, strike out the comma after "of"; page 7, first column, line 33, claim 5, for the word "for" read from; and that the said Letters Patent should be read with these corrections therein that the same may conform to the record of the case in the Patent Office.

Signed and sealed this 19th day of July, A. D. 1938.

Henry Van Arsdale,
Acting Commissioner of Patents.

(Seal)

drive connection from said auxiliary engine to said primary engine, a fuel injection system for said primary engine, means for conducting a heated cooling medium from said auxiliary engine to heat said primary engine, a compression relief mechanism for each of the primary engine cylinders, means interconnecting said compression relief mechanisms for operation in a predetermined sequence, and means for controlling supply of fuel by said fuel injection system.

4. A starting method for a primary compression ignition and the like engine having an auxiliary starting engine, comprising relieving compression in cylinders of the primary engine, enabling circulation between said primary engine and said auxiliary engine of a cooling medium heated by the auxiliary engine, operating the auxiliary engine to drive the primary engine with the fuel injection system of the primary engine disabled, placing compression on cylinders of the primary engine in a predetermined relationship to condition them for firing thereof, and when the primary engine cylinders are in condition to fire supplying fuel to the primary engine.

5. The combination with a primary compression ignition and the like engine, of an auxiliary spark ignition starting engine therefor, a controllable drive connection from said auxiliary engine to said primary engine, a control for said drive connection positioned adjacent said auxiliary engine, a fuel injection system for said primary engine, means for conducting a heated cooling medium for said auxiliary engine to heat said primary engine, a compression relief mechanism for each of the primary engine cylinders, common means for operating said compression relief mechanism including a control member positioned adjacent said auxiliary engine whereby an operator can readily manipulate said control member and said drive connection control during the starting operation, and means for controlling supply of fuel by said fuel injection system.

6. A starting system for a primary compression ignition and the like engine having a plurality of cylinders, comprising an auxiliary spark ignition starting engine positioned adjacent said primary engine, a controllable drive connection from said auxiliary engine to said primary engine, a control member for said drive connection, a compression relief mechanism for each of the primary engine cylinders, and common means for operating said compression relief mechanism including a single control member, both of said control members being positioned adjacent said auxiliary engine whereby they may be readily manipulated by an operator during the starting operation.

7. A starting system for a primary compression ignition and the like engine having a plurality of cylinders, comprising an auxiliary spark ignition starting engine, said auxiliary engine being secured to said primary engine to provide a compact structure, a controllable drive connection from said auxiliary engine to said primary engine, a control member for said drive connection, a compression relief mechanism for each of the primary engine cylinders, and common means for operating said compression relief mechanism including a single control member, both of said control members being positioned adjacent said auxiliary engine whereby they may be readily manipulated by an operator during the starting operation.

CARL G. A. ROSEN.

---

CERTIFICATE OF CORRECTION.

Patent No. 2,119,794. June 7, 1938.

CARL G. A. ROSEN.

It is hereby certified that error appears in the printed specification of the above numbered patent requiring correction as follows: Page 6, second column, line 44, claim 1, strike out the comma after "of"; page 7, first column, line 33, claim 5, for the word "for" read from; and that the said Letters Patent should be read with these corrections therein that the same may conform to the record of the case in the Patent Office.

Signed and sealed this 19th day of July, A. D. 1938.

Henry Van Arsdale,
Acting Commissioner of Patents.

(Seal)

CERTIFICATE OF CORRECTION.

Patent No. 2,119,794. June 7, 1938.

CARL G. A. ROSEN.

It is hereby certified that error appears in the printed specification of the above numbered patent requiring correction as follows: Page 6, second column, line 44, claim 1, strike out the comma after "of"; page 7, first column, line 33, claim 5, for the word "for" read from; and that the said Letters Patent should be read with these corrections therein that the same may conform to the record of the case in the Patent Office.

Signed and sealed this 19th day of July, A. D. 1938.

Henry Van Arsdale,
Acting Commissioner of Patents.

(Seal)